A. I. V. WILSON.
ELECTROMAGNETIC MOTOR.
APPLICATION FILED AUG. 18, 1910.
1,077,179.
Patented Oct. 28, 1913.
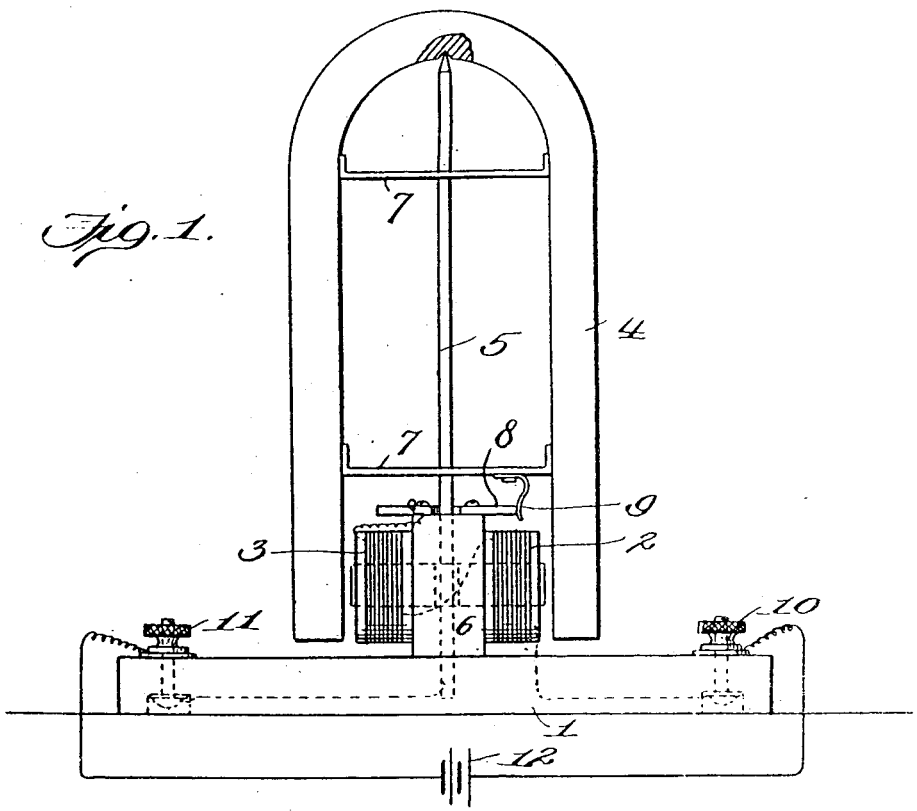
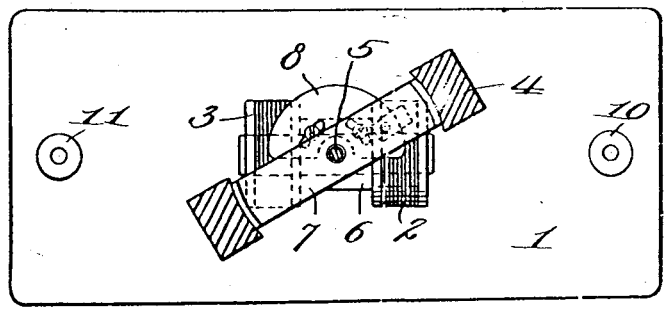
Witnesses
Inventor
Alvin I. V. Wilson

UNITED STATES PATENT OFFICE.

ALVIN I. V. WILSON, OF ATLANTA, GEORGIA, ASSIGNOR OF ONE-THIRD TO CLIFFORD C. HUDSON, OF EAST POINT, GEORGIA.

ELECTROMAGNETIC MOTOR.

1,077,179.  Specification of Letters Patent.  Patented Oct. 28, 1913.

Application filed August 18, 1910. Serial No. 577,786.

*To all whom it may concern:*

Be it known that I, ALVIN I. V. WILSON, a citizen of the United States, residing at Atlanta, in the county of Fulton and State of Georgia, have invented new and useful Improvements in Electromagnetic Motors, of which the following is a specification.

This invention relates to improvements in electro-magnetic motors and it proposes a motor in which the stator consists of an electro-magnet having two poles of opposite polarity and the rotor consists of a permanent magnet which rotates with relation to the electro-magnet.

I have found that a motor of the type herein proposed is capable of many useful applications, serving these applications with much greater efficiency than any other type of motor of which I am aware. The fact that the improved motor is capable of highly efficient use in several different applications results from two characteristics which do not inhere in the generally similar motor of known form, viz., wherein the rotating electro-magnetic armature is combined with a permanent magnetic fluid.

The first characteristic which peculiarly adapts the motor for certain useful applications is that it develops a comparatively high power with relation to its speed and its speed is very constant. This is due to the weight of the revolving permanent magnet which travels at slower speed but has greater momentum than the electro-magnetic armature previously employed. This characteristic adapts the motor to those environments in which a slow speed with a comparatively high power is desirable. For instance, certain constructions of revolving advertising signs must, to be efficient as advertising mediums, be rotated at a comparatively slow rate of speed and yet a comparatively high power is required to produce this rotation. The motor which forms the subject of the present application may be used with advantage in these, as well as various other, environments which will readily suggest themselves.

The second characteristic which peculiarly adapts the motor for certain other useful applications is that the rotor is permanently magnetized instead of intermittently or variably magnetized as heretofore, thus furnishing, so to speak, a moving constant magnetic field; a characteristic which provides for the utilization of the present motor in several environments for which a motor of ordinary construction is not well adapted.

An embodiment of the invention is illustrated in the accompanying drawings, wherein—

Figure 1 is a side elevation of the improved motor; Fig. 2 is a top plan view thereof; and Fig. 3 is a detail sectional view of the electro-magnetic armature.

Similar characters of reference designate corresponding parts throughout the several views.

The motor is mounted upon a suitable base 1 of insulating material and its stator comprises an electro-magnet having two poles of opposite polarity afforded by the windings 2 and 3; the former providing the negative pole and the latter the positive pole, while its rotor comprises the permanent magnet 4 which, in the example shown, is of U shape. The magnet 4 is rotatably hung from a vertical supporting rod 5 which has needle point bearing engagement with the magnet 4 at a point central thereof and which is seated in the base 1, passing through the stationary block 6 of insulating material which carries the electro-magnet aforesaid. The legs of the magnet 4 are connected by transverse straps 7, the rod 5 passing loosely through openings in said straps. The commutator 8 is mounted upon the upper face of the block 6 and, in the example shown, consists of a disk segment which coöperates with a brush 9 depending from the lower strap 7. Binding posts 10 and 11 are suitably located on the base 1 and are connected with a battery 12, the binding post 10 being also connected to the magnet 2, the binding post 11 being connected to the rod 5, and the magnet 3 being connected to the commutator 8.

In operation the current flows through the windings 2 and 3, commutator, lower strap 7, magnet 4, rod 5, and binding post 11, back to battery.

The operation is started by "spinning" the magnet 4 and the brush 9 comes into engagement with the commutator at the instant that the north and south poles of the magnet 4 move into closest proximity to the respective north and south poles of the electro-magnetic stator, the disengagement of said brush of course taking place at the instant that the north and south poles of the magnet 4 move into closest proximity to the respective south and north poles of the electro-magnetic stator. It is of course apparent that the rotation of the permanent magnet is caused by the action of its lines of force which constantly seek to adjust themselves to a variable or intermittent field.

The construction herein proposed combines with the advantages enumerated in the preliminary paragraphs, the further advantage of being of the simplest and least expensive nature.

Having fully described my invention, I claim:

1. An electro-magnetic motor comprising a stator which consists of an electro-magnet having two poles of opposite polarity, a stationary block carrying the electro-magnet, a rod arranged centrally of the block, a U-shaped permanent magnet rotatably hung from the upper end of the rod, a commutator mounted on the block and connected to one of the windings of the electro-magnet, and a brush carried by the permanent magnet for coöperation with the commutator.

2. An electro-magnetic motor comprising a stationary electro-magnet having two poles of opposite polarity, a vertical rod, a U-shaped perpendicularly arranged permanent magnet hung from the upper end of said rod for rotation in surrounding relation to the electro-magnet, a strap connecting the legs of the permanent magnet and having a guide opening through which said rod passes, a commutator electrically connected with the electro-magnet, and a brush connected to said strap for coöperation with said commutator.

In testimony whereof I have hereunto set my hand in presence of two subscribing witnesses.

ALVIN I. V. WILSON.

Witnesses:
  B. H. TREODWELLS,
  S. B. SCOTT.

Copies of this patent may be obtained for five cents each, by addressing the "Commissioner of Patents, Washington, D. C."